(12) United States Patent
Saito

(10) Patent No.: US 6,309,264 B1
(45) Date of Patent: Oct. 30, 2001

(54) CYLINDER ASSEMBLY FOR MARINE PROPULSION UNIT

(76) Inventor: Hideki Saito, 14 Nippashi, Hamamatsu, Shizuoka 438-8501 (JP)

( * ) Notice: Subject to any disclaimer, the term of this patent is extended or adjusted under 35 U.S.C. 154(b) by 0 days.

(21) Appl. No.: 09/385,479

(22) Filed: Aug. 30, 1999

(30) Foreign Application Priority Data

Aug. 28, 1998 (JP) .................................................. 10-243883

(51) Int. Cl.[7] .................................................. B63H 20/08
(52) U.S. Cl. .................................................. 440/56; 440/55
(58) Field of Search ................... 440/61, 53, 56, 440/65

(56) References Cited

U.S. PATENT DOCUMENTS

| | | | |
|---|---|---|---|
| 4,545,769 | * 10/1985 | Nakahama et al. | 440/61 |
| 4,786,263 | * 11/1988 | Burmeister et al. | 440/53 |
| 5,261,843 | * 11/1993 | Tsujii et al. | 440/61 |
| 5,718,613 | * 2/1998 | Nakamura | 440/61 |
| 5,746,055 | 5/1998 | Nakamura et al. . | |
| 5,816,872 | * 10/1998 | Saito | 440/61 |
| 5,882,235 | * 3/1999 | Nakamura | 440/61 |
| 6,062,924 | * 5/2000 | Nakamura | 440/61 |
| 6,139,380 | 10/2000 | Uematsu . | |

* cited by examiner

Primary Examiner—S. Joseph Morano
Assistant Examiner—Andy Wright
(74) Attorney, Agent, or Firm—Knobbe, Martens, Olson & Bear, LLP

(57) ABSTRACT

An improved hydraulic cylinder arrangement for a marine propulsion unit permits primarily effective tilt and trim movement through a compound tilt and trim cylinder. At least one first shock absorber valve is provided on a tilt piston and at least one second shock absorber valve is provided on a tilt cylinder that acts as a trim piston in a trim adjusted range operation. In another feature of the invention, a filter is disposed upstream of the second shock absorber valve.

25 Claims, 7 Drawing Sheets

CYLINDER ASSEMBLY FOR MARINE PROPULSION UNIT

BACKGROUND OF THE INVENTION

1. Field of the Invention

This invention relates to a lift cylinder assembly and is particularly to an improved hydraulic cylinder arrangement that is particularly well suited for use with a marine outboard propulsion unit.

2. Description of the Related Art

Many types of marine propulsion units include a hydraulic motor assembly that is interposed between the outboard drive portion of the propulsion system and the watercraft transom. This hydraulic mechanism is provided for a number of purposes. The first of these purposes is to permit the outboard drive to pop-up when an underwater obstacle is struck so as to avoid damage to the lower unit. Once the underwater obstacle is cleared, the weight of the outboard drive returns it to its previous trim adjusted position.

In addition to this shock-absorbing function, the shock-absorbing mechanism is also constructed so as to preclude the outboard motor from popping-up when operated in reverse mode. That is, the pressure at which the shock absorber valve opens is chosen to be low enough to permit adequate shock-absorbing when underwater obstacles are struck, but high enough to resist the pop-up action when operating in reverse drive.

The functions can be achieved with relatively conventional shock absorbers. It is also desirable, however, to provide an arrangement wherein the marine propulsion unit can be hydraulically trimmed when operating under power. In addition, the hydraulic mechanism may also be employed for tilting the outboard drive up out of the water when not in use or for other purposes, such as for inspection.

Obviously, in order to permit trimming when operating under power, the hydraulic motor must provide large forces. This often is accomplished by providing relatively large effective piston areas over which the hydraulic pressure operates. Although providing good hydraulic force for trim operation, these types of mechanisms are very slow in tilt up operation.

Therefore, it has been proposed to employ one hydraulic motor that operates to provide the trim adjustment. This hydraulic motor has a relatively large diameter piston and, thus, has a relatively low stroke for a given fluid displacement. In addition, a smaller bore, but longer stroke, tilt fluid motor is also coupled to the outboard drive for effecting the tilt up operation. Thus, high speed tilting can be accomplished without loss of power for trim operation. These mechanisms are, however, quite complicated and require several fluid motors and control valve arrangements so as to actuate the proper motor when trim or tilt of the outboard motor is required.

Telescopic or compound hydraulic motors provide a single external cylinder to accomplish both the tilt and trim functions. A tilt cylinder is slidably supported in this outer or trim cylinder and it itself defines an internal cavity in which a tilt piston is provided. These systems basically operate by effecting hydraulic pressure actuation of both the trim and tilt cylinders simultaneously for a portion of the stroke during which the trim movement is accomplished. The tilt cylinder is then held and the tilt piston, which has a smaller effective piston area, is operated for tilt up operation.

One exemplary hydraulic cylinder arrangement will now be described for the reader's understanding of the conventional arrangement with particular reference to FIGS. 1A through 1E. This arrangement is also disclosed in the U.S. Pat. No. 5,718,613, which is hereby incorporated by reference.

FIGS. 1A through 1E illustrate in the five views the conditions at fully tilted and trimmed down position shown in FIG. 1A, through intermediate positions, to a fully trimmed up position shown in FIG. 1C, and to a fully tilted up position shown in FIG. 1E. This prior type of mechanism is indicated generally by the reference numeral 11 in these figures and is connected between a marine outboard drive, which may either constitute the outboard drive portion of an inboard-outboard drive or an outboard motor per se.

The combined tilt and trim fluid motor 11 includes an outer cylindrical housing assembly or tilt cylinder, indicated generally by the reference numeral 12 which has an integral trunion 13 having an opening 14 to pass a pivot pin for pivotal connection to the transom of the associated watercraft.

The tilt cylinder 12 defines an internal cavity 15 in which a tilt cylinder 16 is slidably supported. The tilt cylinder 16, in turn, divides the cylinder bore 15 of the cylinder housing 12 into an upper chamber 17 and a lower chamber 18. Suitable connections link the chambers 17, 18 with a hydraulic pressure circuit. Although a part of actual connections are formed at the wall portion of the outer cylinder 12 and not seen, inlet and outlet ports 19a, 19b are schematically indicated in these figures. The hydraulic pressure circuit is provided for pressurizing either the lower chamber 18 or the upper chamber 17 and depressurizing the other chamber in a known manner.

A tilt piston 20 is slidably supported within a bore 21 of the tilt cylinder 16. The tilt piston 20 has affixed to it a piston rod 22 that extends through openings in the end of the tilt cylinder 16 and the outer cylinder 23. A trunion 23 is provided on the exposed end of the piston rod 22. The trunion 23 has a bore 24 that is adapted to pass a pin (not shown) for providing a pivotal connection to the outboard drive.

Positioned in the tilt cylinder bore 21 below the piston 20 is a floating piston 25. The floating piston 25 is retained in the bore 21 below the tilt piston 20 by means that include a retainer device 26 which is urged by springs 26a toward the upper chamber 17. A latch operating mechanism 27 is interposed between the retainer device 26 and the floating piston 25 and cooperates with a plurality of detent balls 28. The detent balls 28 are adapted to engage corresponding recesses 29 in the outer cylinder 12 at the end of the trim stroke for locking the tilt cylinder 16 at this position, as FIG. 1D.

A shock absorber valve, indicated by the reference numeral 31, is carried by the tilt piston 20 and permits flow from the chamber formed above the tilt piston 20 within the tilt cylinder bore 21 to the area between the trim piston 19 and the floating piston 25. When an underwater obstacle is struck, the tilt piston 20 is urged upwardly and, if sufficient force is applied to open the shock absorber 31, fluid is displaced from the chamber in the trim piston cylinder bore 21 to the area between the tilt piston 29 and the floating piston 25. When this occurs, less fluid will be displaced from above the tilt piston 20 than below it and the floating piston 25 may move slightly upwardly.

Displacement of fluid from the chamber above the tilt piston 20 within the tilt cylinder bore 21 is precluded by a check valved passageway 32. This check valved passageway permits the piston 20 to act as a conventional shock absorber.

Once the underwater obstacle, which has been struck and has caused the popping up action has been cleared, the tilt piston 20 moves downwardly through the opening of a let down valve 33 which opens at a substantially lower pressure than the shock absorber valve 31. The let down valve 33 provides no significant damping and can be opened merely by the weight of the outboard drive acting on the tilt piston 20.

If the operator desires a trim up operation, the prior hydraulic mechanism shown in FIGS. 1A–1B is pressurized so that the chamber 18 below the floating piston 25 and tilt cylinder 16 will be pressurized. At the same time, the chamber 17 is depressurized by opening it to return. When the chamber 18 is pressurized, the fluid pressure acts upon the lower face of the tilt cylinder 16 and also on the floating piston 25 and on the tilt piston 20 to cause this assemblage to move upwardly as shown in FIG. 1B to a desired trim adjusted position. When the desired position is reached, then the pressurization is discontinued and the chambers 18, 17 are hydraulically locked so as to hold the new trim adjusted position. The shock-absorbing function previously described can operate with the drive positioned at a desired position in the trim range.

To effect trim down operation, the chamber 17 is pressurized and the chamber 18 is opened to return. The pressure of the driving force of the outboard drive can force the trim down operation without requiring hydraulic assist.

FIG. 1C shows the fully trimmed up position. In this position, the detent balls 28 are aligned with the recesses 29. At this same time, the tilt cylinder 16 will engage a stop at the upper end of the outer cylinder 12 so as to preclude further upward movement.

Tilt-up can be accomplished by continuing to pressurize the chamber 18 and opening the chamber 17 to return. However, since the check valve 32 would preclude the displacement of fluid from the tilt cylinder bore 21 by the tilt piston 20, a small valve actuating plunger 34 is provided within the tilt cylinder 16 to unseat the check valve 32 and permit upward movement of the tilt piston 20, as shown in FIG. 1D. When this continues, the retainer 29 will permit the detent balls 28 to be forced outwardly by a spring mechanism, which will be described later by reference to the actual detailed embodiment, and lock the tilt cylinder 16 in position. The reason for doing this will be described later.

Pressurization of the chamber 18 thus forces the floating piston 25 and tilt piston 20 to move upwardly. When this occurs, fluid is displaced past the open check valve 32 back to the return side.

The described construction provides a large effective area for trim operation and a smaller effective area for faster tilt-up operation. This tilt-up operation continues until the position shown in FIG. 1D. If tilt-down is then required, the chamber 18 is opened to return, and the chamber 17 may be pressurized. This pressure, however, will not cause the tilt cylinder 16 to move downwardly because the detent balls 28 in their receptive grooves 29 hold the tilt cylinder 16 against movement, and the mechanism will move back to the position shown in FIG. 1D. This permits faster tilt down than if the tilt cylinder 16 were also free to move downwardly.

This continues until the floating piston 25 and tilt piston 20 move to the position shown in FIG. 1C, wherein the detent balls 28 can again be released to permit trimming down to the desired position.

As has been noted above, when an underwater obstacle is struck the outboard drive, the popping up action is caused by this hydraulic mechanism and destruction of the outboard drive is prevented from occurring effectively. However, in the event that a massive obstacle is struck and huge force is abruptly exerted upon the outboard drive, tremendous pressure is produced in the tilt cylinder bore 21. If this pressure is beyond ability of the shock absorber valve 31, the piston rod 22 will be greatly restricted in its rapid upward motion. As a result, the outboard drive may not clear the obstacle smoothly. This gives rise to deterioration of durability of the outboard drive.

The aforenoted problem is not particular with the compound hydraulic mechanism and may occur, for example, with a single hydraulic mechanism that has only a tilt fluid motor.

For some occasion, foreign particles may enter the fluid and they can adversely affect the operation of the hydraulic device. For instance, under certain conditions, if a foreign particle is stuck at the shock absorber valve, fluid can pass through the valving passage without any intentional control and hence the hydraulic device may not hold the drive unit at an adjusted trim position. Also, the non-controlled fluid flow may damage the normal function of the hydraulic device.

SUMMARY OF THE INVENTION

In accordance with one aspect of this invention, a telescopic tilt and trim hydraulic cylinder arrangement for an outboard drive and watercraft comprises an outer cylinder adapted to be affixed to one of the outboard drive and the watercraft. The outer cylinder defines a first internal cavity. A tilt cylinder is received and slidably supported within the first internal cavity. The tilt cylinder defines a second internal cavity. A tilt piston is slidably received in the second internal cavity. A piston rod is affixed to the tilt piston and extends beyond the internal cavities for attachment to the other of the outboard drive and the watercraft. A first valving mechanism is provided in the tilt piston for causing shock-absorbing flow of fluid across the sides of the tilt piston for permitting popping up of the outboard drive when an underwater obstacle is struck with sufficient force. A second valving mechanism is provided in the tilt cylinder for causing another shock-absorbing flow of the fluid across the sides of the tilt cylinder.

In accordance with another aspect, a telescopic tilt and trim hydraulic cylinder arrangement for an outboard drive and watercraft comprises an outer cylinder adapted to be affixed to one of the outboard drive and the watercraft. The outer cylinder defines a first internal cavity. A tilt cylinder is received and slidably supported within the first internal cavity. The tilt cylinder defines a second internal cavity. A tilt piston is slidably received in the second internal cavity. A piston rod is affixed to the tilt piston and extends beyond the internal cavities for attachment to the other of the outboard drive and the watercraft. Means are provided for selectively pressurizing the first cavity for causing reciprocal movement of the tilt cylinder and the tilt piston for effecting trim adjustment of the outboard drive and effecting tilt up movement of the outboard drive. A valving mechanism is provided in the tilt cylinder for causing shock-absorbing flow of fluid across the sides of the tilt cylinder for permitting popping up of the outboard drive when an underwater obstacle is struck with sufficient force.

In accordance with a further aspect of the invention, a hydraulic cylinder arrangement for an outboard drive and watercraft comprises an outer cylinder adapted to be affixed to one of the outboard drive and the watercraft. The outer cylinder defines an internal cavity. A piston is received and slidably supported within the internal cavity. A piston rod is affixed to the piston and extends beyond the internal cavity for attachment to the other end of the outboard drive and the watercraft. Means are provided for selectively pressurizing the cavity for causing reciprocal movement of the piston for effecting at least tilt up movement of the outboard drive. A first valving mechanism is provided for causing shock-absorbing flow of fluid across the sides of the piston for permitting popping up of the outboard drive when an underwater obstacle is struck with sufficient force. A second valving mechanism is provided for causing another shock-absorbing flow of the fluid. The first valving mechanism operates under a first pressure larger than a first predetermined pressure. The second valving mechanism operates under a second pressure larger than a second predetermined pressure. The second predetermined pressure is larger than the first predetermined pressure.

In accordance with a still further aspect, a hydraulic cylinder arrangement for an outboard drive and watercraft comprises an outer cylinder adapted to be affixed to one of the outboard drive and the watercraft The outer cylinder defines an internal cavity. A piston is received and slidably supported within the cavity. A piston rod is affixed to the piston and extends beyond the internal cavity for attachment to the other end of the outboard drive and the watercraft. Means are provided for selectively pressurizing the cavity for causing reciprocal movement of the piston for effecting at least tilt up movement of the outboard drive. A valving mechanism is provided in the piston for causing shock-absorbing flow of fluid across the sides of the piston for permitting popping up of the outboard drive when an underwater obstacle is struck with sufficient force. The valving mechanism includes a passage through which the fluid flows. A closure assembly is also included for closing the passage unless the underwater obstacle is struck. A filter is further included and disposed upstream of the flow of the fluid.

Further aspects, features and advantages of this invention will become apparent from the detailed description of the preferred embodiment which follow.

BRIEF DESCRIPTION OF THE DRAWINGS

As noted above.

DETAILED DESCRIPTION OF THE PREFERRED EMBODIMENT OF THE INVENTION

Figure 1:
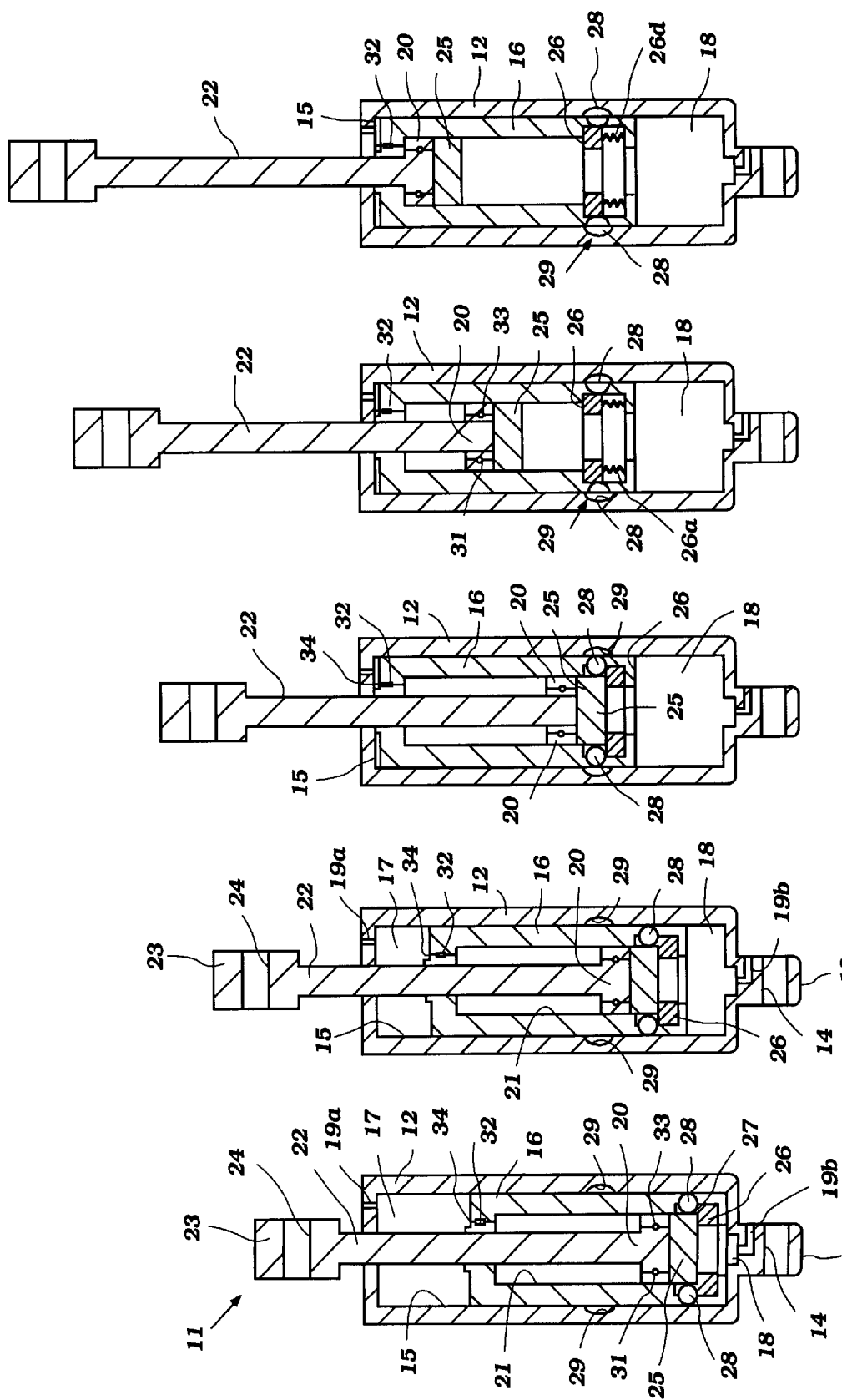
FIGS. 1A through 1E illustrate, in the five views thereof, the conditions of a conventional tilt and trim hydraulic device. These figures are provided in order to assist the reader's better understanding of an exemplary conventional arrangement and its operation and also for the reader appreciate the aspects, features and advantages associated with the present cylinder arrangement.
Figure 2:
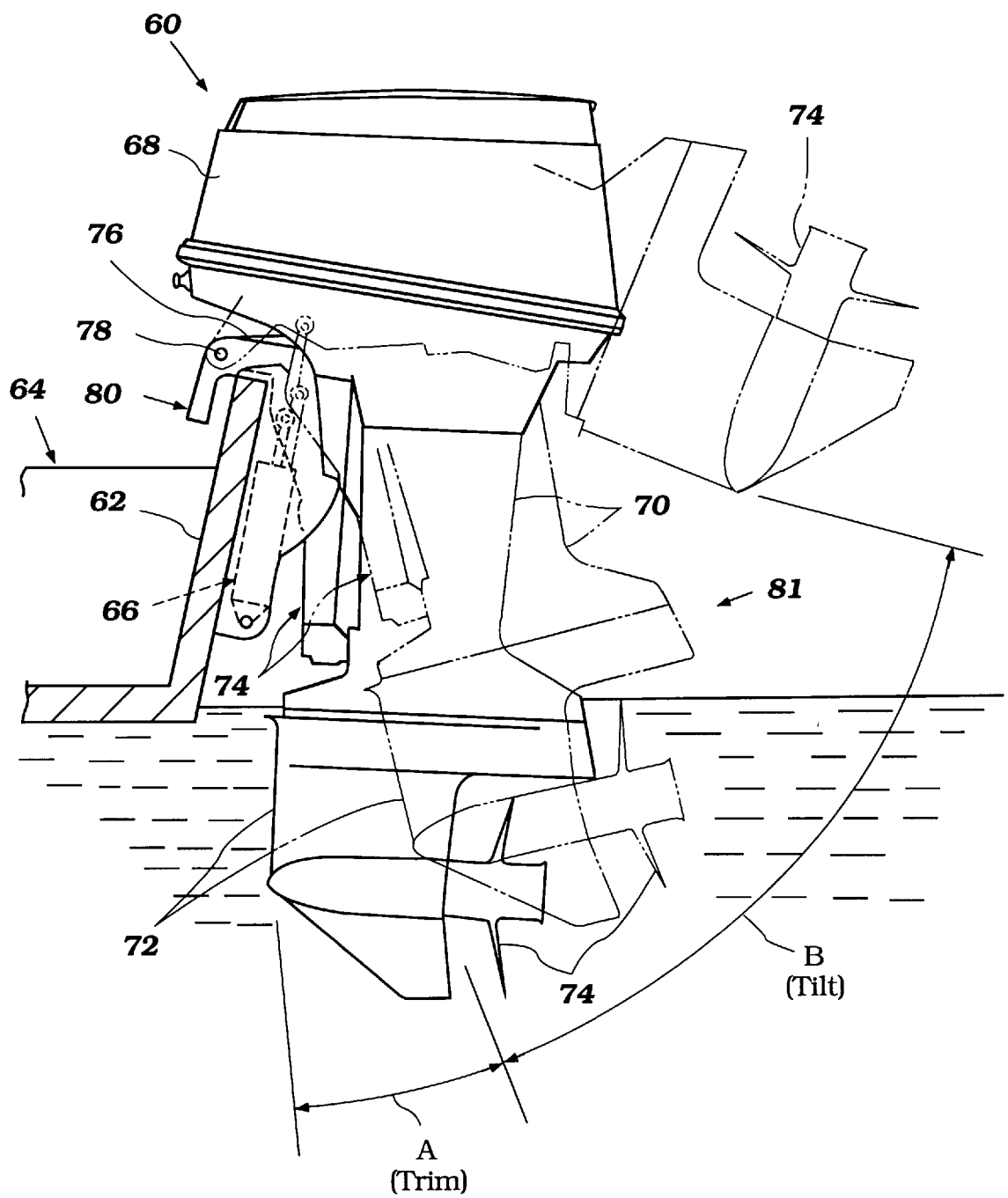
FIG. 2 is a side elevational view of an outboard motor including a cylinder assembly constructed in accordance with an embodiment of the invention. The outboard motor is illustrated as attached to the transom of an associated watercraft (shown partially and in section) and shows in the sold line the outboard motor in a fully trimmed down position, shows the outboard motor in phantom lines in a fully trimmed up position, and shows the outboard motor in phantom line in a fully tilted up position with the motor out of water.

With initial reference to FIG. 2, an outboard motor, which is identified generally by the reference numeral 60, includes a tilt and trim adjustment system with ,a cylinder assembly constructed in accordance with a preferred embodiment of the invention. The outboard motor 60 is shown as attached to a transom 62 of an associated watercraft 64 (shown partially). The hydraulic tilt and trim adjustment mechanism or device constructed in accordance with the embodiment of the invention is identified generally by the reference numeral 66 and is shown in more detail in FIGS. 3 through 9. The attachment of the hydraulic tilt and trim adjustment mechanism 66 to the associated watercraft 64 and its relationship to the outboard motor 60 is basically the same as the prior art type of devices.

Also, although the invention is described in conjunction with an outboard motor, the present cylinder assembly can be used with tilt and trim adjustment mechanisms associated with use with other types of outboard drives, such as, for example, the outboard drive portion of an inboard, outboard drive. Other usages will also be readily obvious to those skilled in the art.

The outboard motor 60 includes a power head 68 which is comprised of a powering internal combustion engine and a surrounding protective cowling. As is typical with outboard motor practice, the engine of the power head 68 is supported so that its output shaft rotates about a vertically extending axis and drives a drive shaft that is journaled within a drive shaft housing 70. The drive shaft extends through the drive shaft housing 70 and into a lower unit 72, and drives a propulsion device such as a propeller 74 through a conventional forward/neutral/reverse transmission. The construction of the internal components of the outboard motor 60 are conventional and well known to those skilled in the art.

A steering shaft (not shown) is affixed to a drive shaft housing 70 and is supported for steering movement within a swivel bracket 74 in a known manner. The swivel bracket 74 has a forwardly extending portion 76 that is connected by means of a pivot pin 78 to a clamping bracket 80. The clamping bracket 80 is adapted to be detachably affixed to the transom 62 in a well known manner.

The unit consisting of the power head 68, driveshaft housing 70 and lower unit 72 except for the swivel bracket 74 and cramp bracket 80 will be termed a drive unit 81.

The pivotal connection 78 between the clamping bracket 80 and the swivel bracket 74 permits the drive unit 81 to be moved through a trim adjusted range, indicated as range A in FIG. 2, wherein the drive unit 81 as positioned in a fully trimmed down position is shown in solid lines and as in a fully trimmed up position is shown in phantom lines. In addition, the drive unit 81 may be swung about the pivot pin 78 through a remaining arc B to a fully tilted up position out of the water, as is also shown in a phantom line. The hydraulic tilt and trim adjustment mechanism 66 operates to effect these movements and other movements as will become apparent.

The hydraulic tilt and trim adjustment mechanism 66 and its connection to the assembly will now be described by additional reference to FIG. 3. It will be seen that the clamping bracket 80 actually comprises a pair of spaced apart side portions 82 that are mounted on the rear of the transom 62 with the swivel bracket 74 being interposed between them. The hydraulic tilt and trim adjustment mechanism 66 is nested between the brackets 82 so as to provide a compact assembly.

The hydraulic tilt and trim adjustment mechanism 66 comprises a hydraulic motor assembly, indicated generally by the reference numeral 84, which is disposed adjacent to and which forms an integral part with the powering assembly 86 therefor. The hydraulic motor assembly 84 is a telescopic type of compound tilt and trim fluid motor, which will be apparent with the following descriptions; however, various aspect of the present invention also can be used with other types of tilt and trim cylinder assemblies (e.g., assemblies involving separate tilt and trim cylinders). The powering assembly 86 includes at its upper end a reversible electric motor 88. A reversible hydraulic pump 90 is disposed below the motor 88. The powering assembly 86 has a switch button (not shown) that can be pushed by an operator of the outboard motor 60 to turn on the powering assembly 86.

Figure 4:
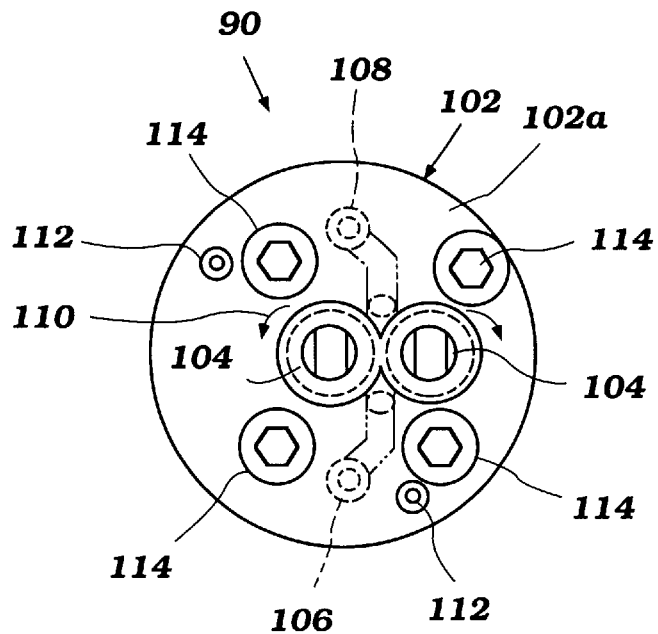
FIG. 4 is a top plan view of a reversible hydraulic pump of the tilt and trim adjustment mechanism of FIG. 3.
Figure 5:
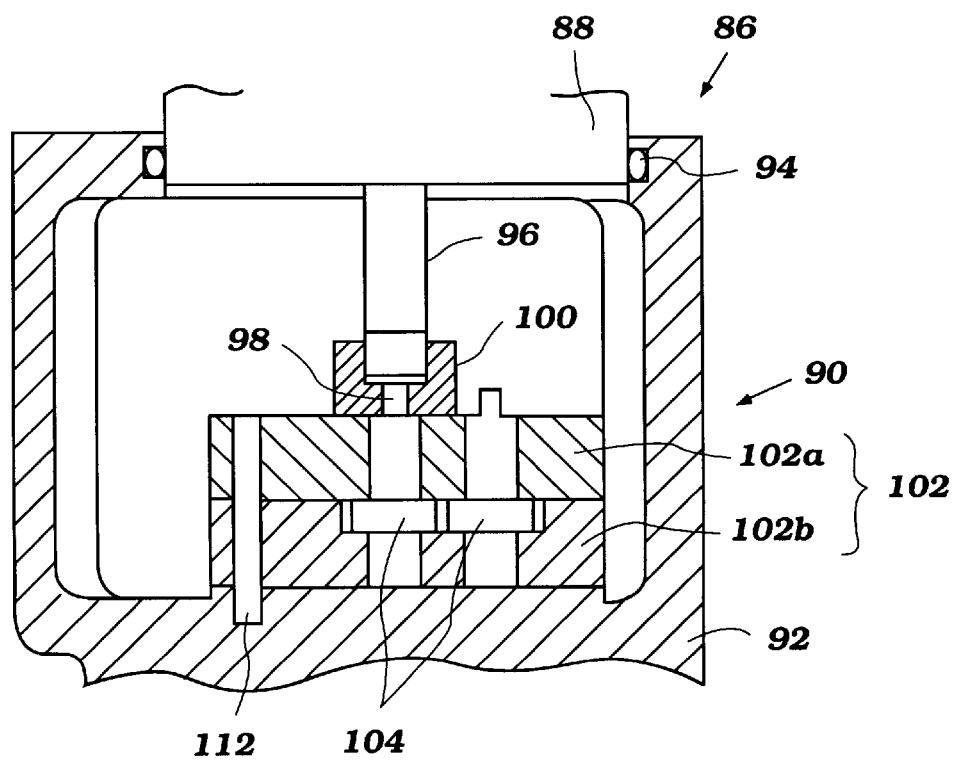
FIG. 5 is a partial, cross-sectional, side view of a hydraulic motor assembly, which includes the hydraulic pump of FIG. 4.

With reference to FIGS. 4 and 5, the powering assembly 86 will be described in detail hereunder. As seen in FIG. 5, the reversible electric motor 88 is mounted on a housing 92 of the hydraulic pump 90 in a suitable manner. The housing 92 has a groove to receive an O-ring 94 for sealing the inner cavity of the housing 92. The electric motor 88 has a shaft 96 connected to a rotor 98 of the hydraulic pump 90 via a joining member 100. The hydraulic pump 90 generally comprises a casing 102 that includes an upper casing 102a and a lower casing 102b, a pair of gears 104, an inlet and outlet ports 106, 108. The gears 104 are meshed with each other in the casing 102 and the rotor 98 is actually a shaft of one of the gears 104. Thus, when the rotor or shaft 98 of the gear 104 is driven by the electric motor, the gears 104 are rotated to function as a pump and push fluid to the hydraulic motor assembly 84 through the ports 106, 108. Since the electric motor 88 and the hydraulic pump 90 are reversible, when the gears 104 are rotated in a direction indicated by the arrow 110, the port 106 and the port 108 will function as the inlet port and the outlet port, respectively. Meanwhile, when the gears 104 are rotated in the opposite direction, respective ports 108, 106 will assume the opposite function: port 108 will act as the inlet port and port 106 will act as the outlet port.

The upper casing 102a and the lower casing 102b have almost the same thickness. The both casings 102a, b are positioned with two knock-pins 112 and are fixed to the pump housing 92 with four bolts 114.

Figure 3:
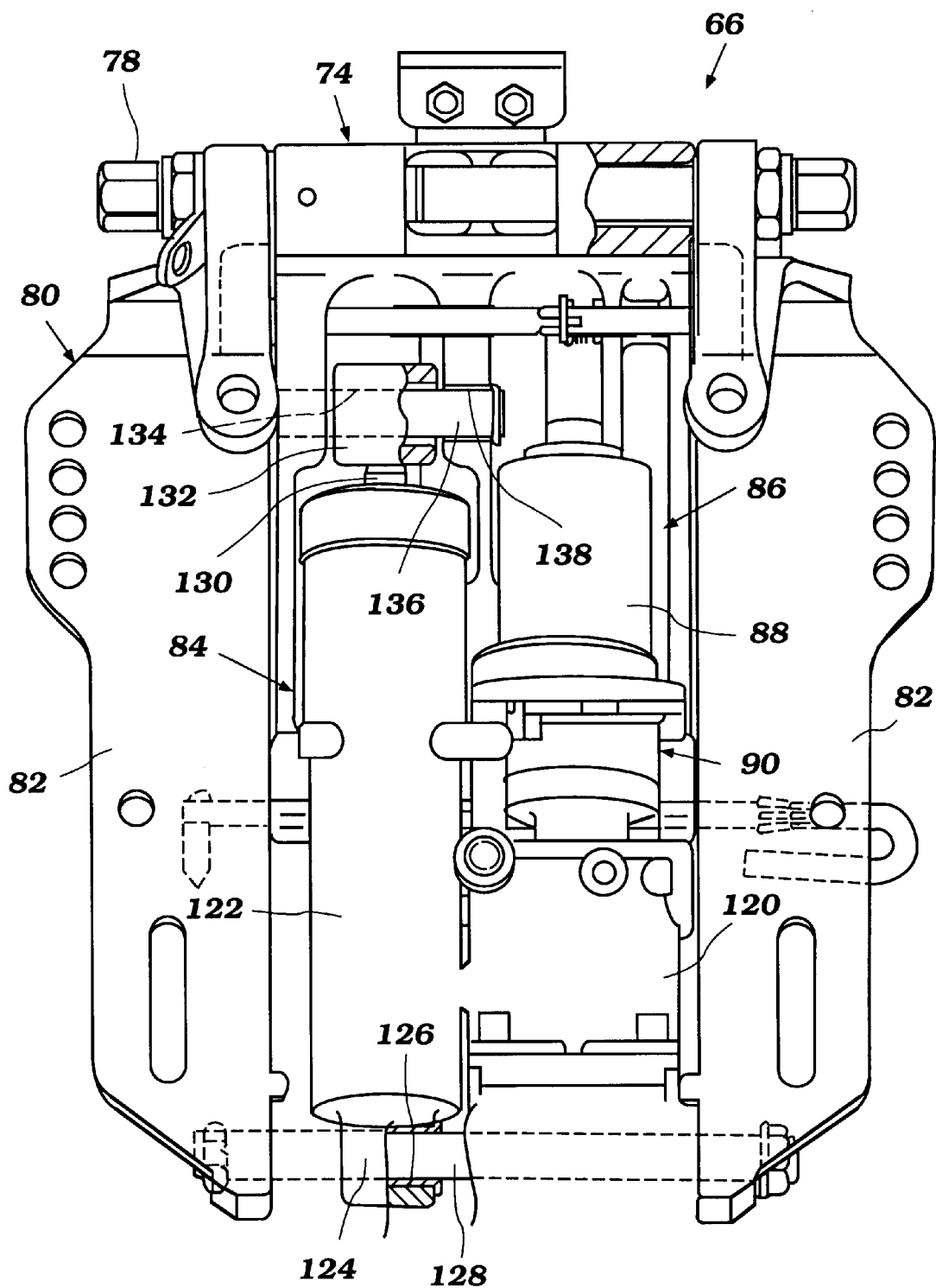
FIG. 3 is an enlarged front elevational view of a hydraulic tilt and trim adjustment mechanism of the outboard motor of FIG. 2 and includes the present cylinder assembly.

As seen in FIG. 3, a fluid reservoir 120 is disposed beneath the pump 90 and contains hydraulic fluid for the system. In addition, a suitable valve assembly may be incorporated within the pump 90 and the reservoir 120 so as to provide normal pressure relief functions and directional control. Fluid will be supplied to the hydraulic motor assembly 84 from the reservoir 120 to compensate the capacity of a piston when it is out of the motor assembly 84.

The outlet and inlet ports 106, 108 of the pump 90 communicate with inlet and outlet ports (not shown) formed in the hydraulic tilt and trim motor unit 84. It should be noted that the outer housing of the units 84 and 120 may be common or they may comprise separate pieces that are affixed to each other. However, by having the above parts integral, the necessity for providing external conduits is avoided and the construction is more compact.

With continued reference to only to the external construction, the hydraulic motor 84 includes an outer cylinder housing or trim cylinder 122 having a trunion portion 124 with a bore 126 so as to receive a pin 128 for providing a pivotal connection to the clamping bracket 80 and specifically to the side plates 82 thereof. In addition, a piston rod 130 has a trunion 132 with a bore 134. This piston rod bore 134 receives a further pivot pin 136 that provides a pivotal connection to a bore 138 formed in a portion of the swivel bracket 74 so as to interpose the hydraulic motor assembly 84 therebetween for the tilt and trim movement which will now be described by reference primarily to FIG. 6.

The outer cylinder housing 122 is provided with a bore comprising three portions, each having a different diameter. These portions include a lower bore 142 which has the smallest diameter and is formed adjacent to the blind end of the trim cylinder 122. Above the bore 142 is an intermediate larger diameter bore 144. At the upper end bore 144 there is provided a further still larger diameter bore 146 which is closed at its upper end by an end closure assembly 148.

A tilt cylinder, indicated generally by the reference numeral 150, is slidably supported within these three bores 142, 144 and 146. It will be readily apparent that this tilt cylinder 150 works as a trim piston in the trim adjusted range operation. The tilt cylinder 150 is formed itself with a lower smaller diameter portion 152 which is contained primarily within the lower bore 142, but which extends partially in all positions into the upper end bore 144. Above the cylindrical portion 152 there is provided a further portion 154 which has an outer diameter that is complimentary to the outer cylinder bore 144 and which is received in this bore 144 and also in the bore 146 in all of its positions.

The upper end of the tilt cylinder 150 is generally closed with an end cap 156 that divide a first fluid cavity 162 and a second fluid cavity 164. The first cavity 162 is, thus, generally defined by the cylinder bore 146, the closure assembly 148 and the end cap 156. Also, the second cavity 164 is generally defined by the tilt cylinder 150, the end cap 156 and a tilt piston 166. The tilt piston 166 is affixed to the lower end of the piston rod 130 and is slidably movable in the tilt cylinder 150. The piston rod 130 extends through the end cap 156 and outwardly through the closure assembly 148. O-rings 168, 170 are received in grooves provided at the respective closure assembly 148 and end cap 156 to sealingly support the piston rod 130. Another seal member 172 is provided further at the outer end of the closure assembly 148. The tilt piston 166 will be described more in detail below with reference to FIG. 7.

The first fluid cavity 162, which is in communication with the hydraulic pump 90, communicates with an internal passage that terminates adjacent to the end closure assembly 148. The internal passage, however, does not appear in the figures.

The end cap 156 has a passage 174 that communicates with the first fluid cavity 162 and the second fluid cavity 164. At the passage 174, a trim-tilt switchover valve assembly 176 is placed. The valve assembly 176 closes the passage 174 when the drive unit 81 is in the trim adjusted range A and opens the passage 174 when the drive unit 81 is in the tilt range B.

Figure 6:
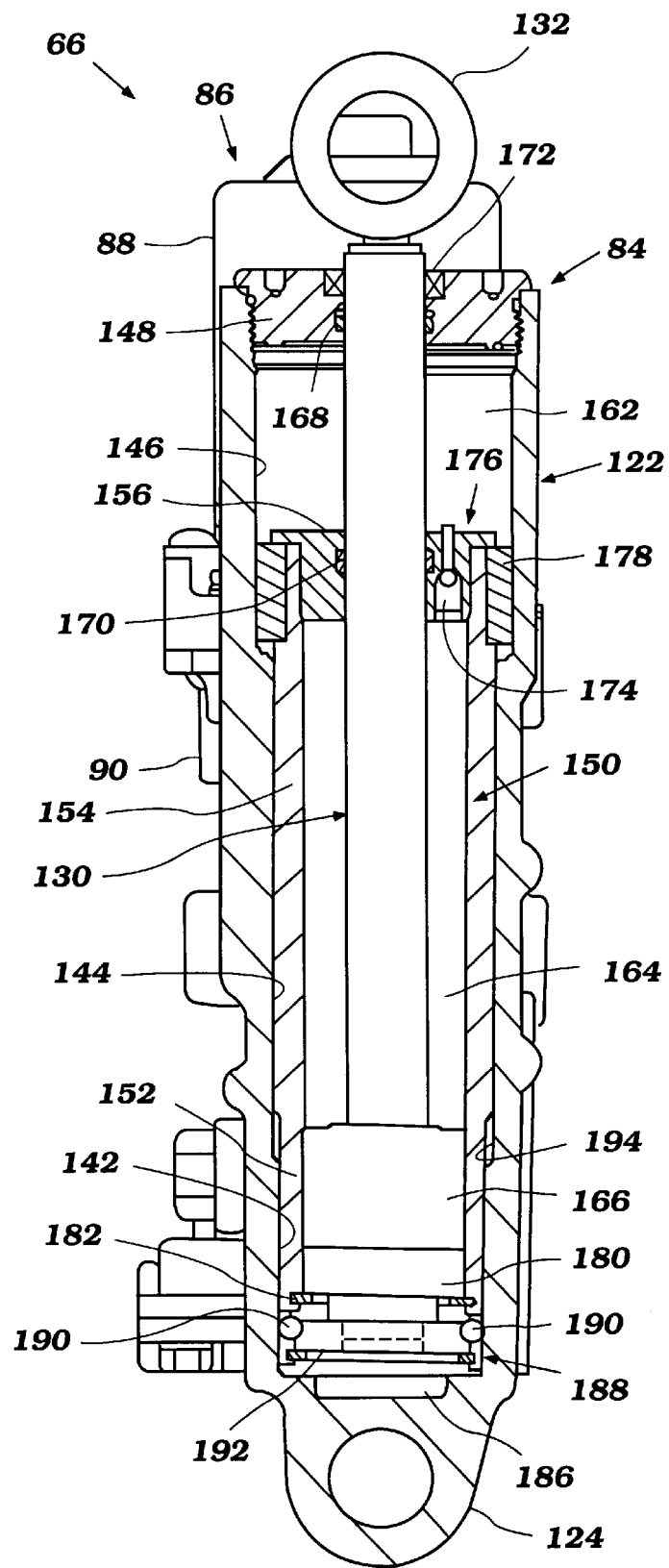
FIG. 6 is a cross-sectional, side view taken through the telescopic tilt and trim cylinder assembly of FIG. 3.

The tilt cylinder 150 has a liner member 178, which is schematically shown in FIG. 6, at the top and outer periphery. The liner member 178 is supported on the tilt cylinder 150 and is slidably movable within the outer cylinder housing 122. The trim-tilt switchover valve assembly 176 and the liner member 178 will be described in more detail below with reference to FIGS. 8 and 9.

Whit reference to FIG. 7, a floating piston 180 is positioned within a tilt cylinder bore 181 below the tilt piston 166. The floating piston 180 can move axially within the tilt cylinder bore 181 but its lower most position is limited by a stopper ring 182 that is engaged with the lower end of the tilt cylinder 150. The floating piston 180 usually moves with the tilt piston 166. However, when an underwater obstacle is struck, only the tilt piston 166 moves upwardly and the floating piston 180 remains where it is so as to preserve the orginal trim adjusted position. A third fluid cavity 186 is formed below the floating piston 180. In the event of the hit by an underwater obstacle, a fourth fluid cavity is formed between the tilt piston 166 and the floating piston 180. This mechanism, i.e., a shock-absorbing mechanism, will be described shortly with reference to FIG. 7.

A latch operating mechanism 188 is also provided under the floating piston 180. The latch operating mechanism 188 generally comprises detent balls 190 and a biasing member 192 accommodating springs therein for urging the detent balls 190 to engaged positions. At the end of the trim operation, the detent balls 190 are latched by a recess 194 formed at the intermediate larger bore 144 directly continuing from the smaller bore 142 and prevent the tilt cylinder 150 from sliding downward. This latching mechanism 188 will be described in more detail also with reference to FIG. 7 below.

Figure 7:
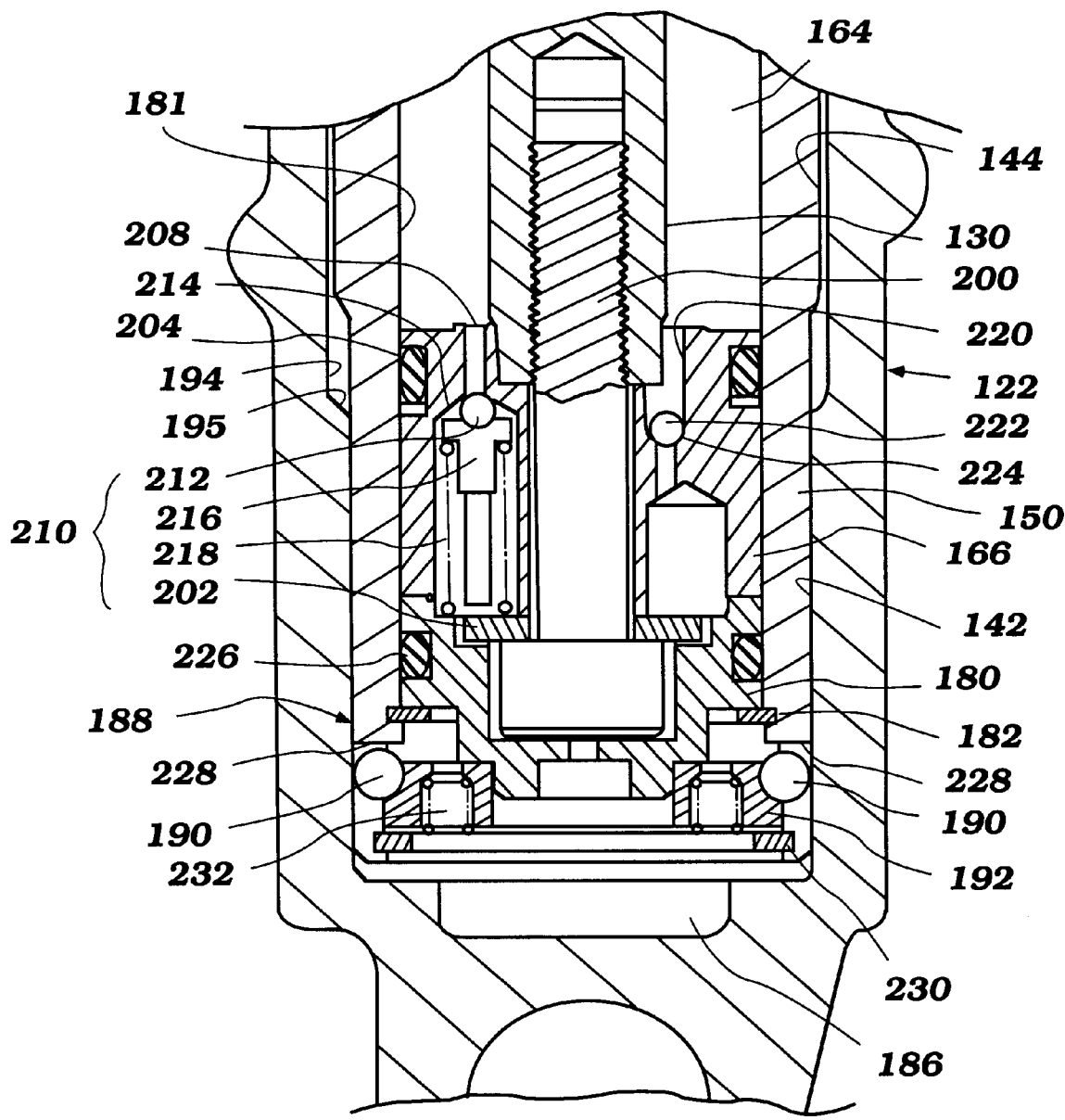
FIG. 7 is an enlarged, partial cross-sectional view of the cylinder assembly shown in FIG. 6 and showing particularly a construction of a tilt piston, a floating piston and a latch operating mechanism of a tilt cylinder of the cylinder assembly.

With reference now to FIG. 7, the tilt piston 166 includes the shock absorber mechanism, the floating piston 180 and the latching mechanism 188.

The tilt piston 166 is affixed to the lower end of the piston rod 130 by a threaded faster 200 which is engaged with a retainer plate 202 which, in turn, holds the body of the tilt piston 166 in place. The tilt piston 166 carries an O-ring 204 which is in sealing engagement with an internal bore 181 of the tilt cylinder 150.

A shock valving passage 208 extends through the tilt piston 166 and a pressure responsive absorber valve 210 is placed at the passage 208. The shock absorber valve 210 comprises a ball 212 seated at a valve seat 214, a retainer 216 which retains the ball 212, and a spring 218 which is positioned between the retainer 216 and generally the retainer plate 202 for urging the ball 212 via the retainer 216 to close the passage 208. The spring force of the spring 218 is selected to overcome the pressure produced in the first cavity 164 when the outboard motor 60 is operated in reverse mode.

A let down valving passage 220 also extends through the tilt piston 166. A ball or check valve 222 is seated at a valve seat 224 and prevents flow from the second cavity 164 to the aforenoted fourth cavity, but permits flow of the opposite direction.

Because of such arrangements in the tilt piston 166, the shock absorber valve 210 permits restricted flow of the fluid from the second fluid cavity 164 to the forth fluid cavity formed between the tilt piston 166 and the floating piston 180 so as to permit the drive unit of the outboard motor 60 to pop up within the tilt range B when an underwater obstacle is struck, assuming sufficient force is applied when the drive 81 strikes the obstacle to open the shock absorber valve 210. When the underwater obstacle is cleared, the drive unit of the outboard motor 60 can again return to its trim adjusted position by fluid flow from the fourth cavity to the second cavity 164 through the let down valving passage 220. These actions are the same as that described with the conventional arrangement shown in FIGS. 1A through 1E.

The floating piston 180 carries an O-ring 226 for providing sealing engagement with the tilt cylinder bore 206. As described above, the floating piston 180 usually moves with the tilt piston 166. However, when an underwater obstacle is struck, the floating piston 180 will remain at the trim adjusted position because the fluid in the third cavity 186 has no way to flow out and thus will be confined therein by operation of a check valve. Hence, when the underwater obstacle is cleared, the tilt piston 166 can return accurately to the trim adjusted position.

When the tilt piston 166 exists at the most trimmed down position, the detent balls 190 are fitted in grooves 228 formed at the lowermost portion of the tilt cylinder 150. An outer shoulder portion of the biasing member 192 supports the detent balls 190 and its lower most position is limited by a stopper ring 230 that is engaged with the lower most end of the tilt cylinder 150. Springs 232 are accommodated in the biasing member 192. These springs 232 urge the detent balls 190 via the biasing member 192 toward the cylinder bore 142.

At the end of the trim up operation, the drive unit 81 reaches the end of the trim adjusted range A (FIG. 2), and the detent balls 190 engage the recess 194. This is similarly shown in FIG. 1C. The tilt cylinder 166 is held at this position and is restricted to move downward. Thus, the tilt cylinder 166 will not fall back to the trim operation during the tilt up movement. Since the recess 194 has a downward slope 195, when the drive unit of the outboard motor 60 is tilted down to approach the trim range A and the tilt cylinder 166 pushes down the detent balls 190, these balls 190 can slip out from the recess 194. Thus, the tilt cylinder 166 can move down to lower the drive unit 81 in the trim adjusted range A.

As described above, in the event that an underwater obstacle is struck, the pressure responsive absorber valve 210 permits the flow from the second fluid cavity 164 to the fourth fluid cavity (formed between the tilt piston 166 and the floating piston 180) and hence the drive unit 81 can clear the underwater obstacle. However, although it is a rare case, a massive obstacle may be struck and a huge force will be abruptly exerted upon the outboard drive 81 producing tremendous pressure in the second cavity 164. If this pressure is beyond ability of the shock absorber valve 210, the piston rod 130 will be restricted in its rapid upward motion and excessively high pressure will occur in the first fluid cavity 162.

In order to release this high pressure in the first cavity 162, a second shock absorber mechanism is provided in the liner member 178. The second shock absorber mechanism as well as the trim-tilt switchover valve assembly 176 will now be described in detail with reference to FIGS. 8 and 9 below.

The end cap 156 is threaded and screwed onto the upper end of the tilt cylinder 150. The end cap 156 carries the O-ring 170 which is in sealing engagement with the piston rod 130. The trim-tilt switchover valve assembly 176 is disposed in the passage 174 of the end cap 156 as noted above. The trim-tilt switchover valve assembly 176 generally includes a ball 242 which is seated at a valve seat 244, a retainer 246 which retains the ball 242, a spring 248 which is disposed between the retainer 246, and a spring base 250. The spring 248 urges the ball 242 via the retainer 246 to close the passage 174. The trim-tilt switchover valve assembly 176 further includes an actuating plunger 252 that is seated on the ball 242 and protrudes upwardly toward the first fluid cavity 162.

During the trim range operation, the passage 174 is closed by the ball valve 242 and the fluid in the second cavity 164 is retained. Accordingly, the tilt cylinder 150 operates as a trim piston and moves upwardly. The drive unit 81 moves within the range A shown in FIG. 2. When the tilt cylinder 150 approaches the upper most portion of the outer cylinder housing 122 and the actuating plunger 252 touches the closure assembly 148, the plunger 252 pushes the ball 242 to open the passage 174. Accordingly, the fluid in the second cavity 164 can flow to the first cavity 162 and, in turn, the tilt piston 166 is released to move upwardly. Thus, the tilt movement of the drive unit 81 within the tilt range B starts and may continue moving up to the fully tilted up position.

Figure 8:
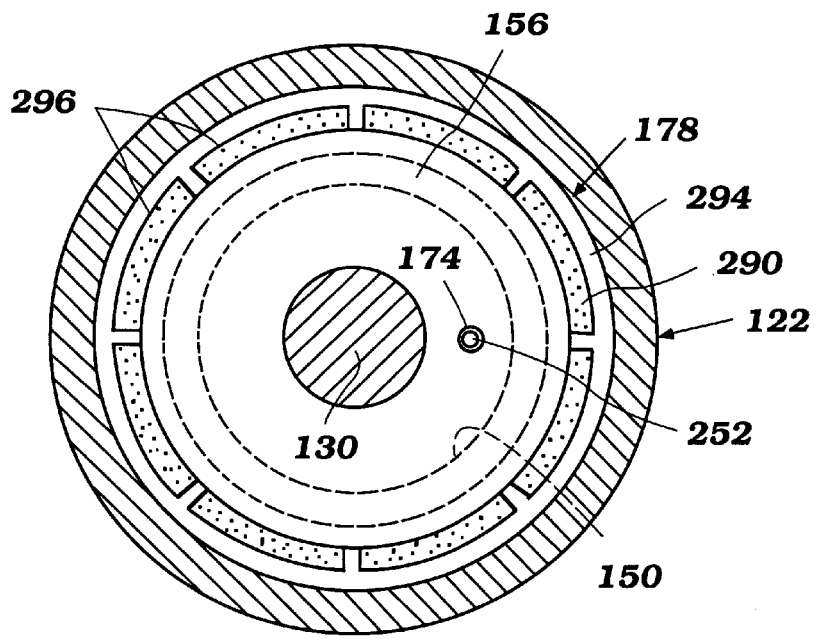
FIG. 8 is an enlarged, cross-sectional plan view showing a top portion of the tilt cylinder, as well as a liner member having a filter member, which is attached to the tilt cylinder.
Figure 9:
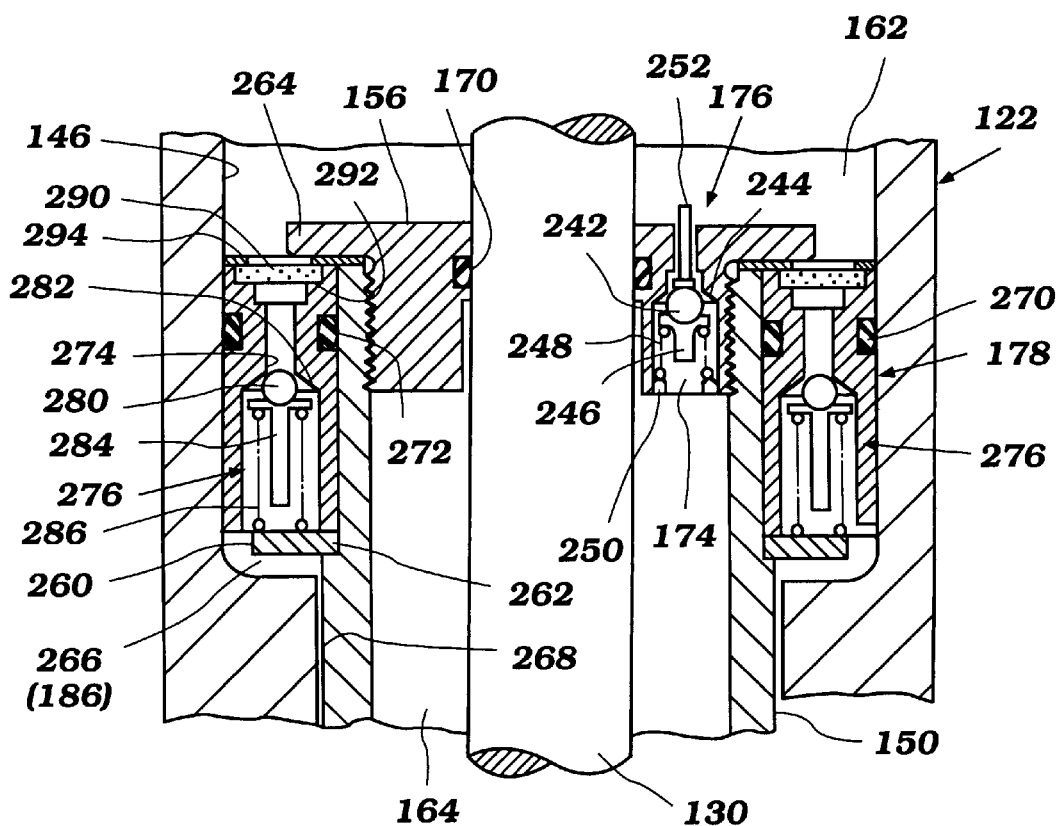
FIG. 9 is an enlarged, partial cross-sectional, side view of the hydraulic cylinder assembly and shows particularly the construction of the liner member, in which shock absorber valves are disposed.

The liner member 178, also shown in FIGS. 8 and 9, is a circular shaped member and is supported on the tilt cylinder 150 to be slidably movable as a unit with the tilt cylinder 150 within the outer cylinder housing 122. A retainer plate 260, which is engaged with a step portion 262 formed around the tilt cylinder 150, supports the liner member 178 at its lower end. Meanwhile, the end cap 156 has a flange 264 to restrict the liner member 178 from detaching.

The space 266 directly below the liner member 178 in the bore 146 communicates with the third fluid cavity 186 through a gap 268 formed between the outer cylinder housing 122 and the tilt cylinder 150. The gap 268 can exist about the entire periphery of the tilt cylinder 150, i.e., have an annular shape. The liner member 178 carries a pair of O-rings 270, 272. The first O-ring 270 provides sealing engagement with the tilt cylinder 150, while the second O-ring 272 provides sealing engagement with the cylinder housing bore 146. Thus, the first cavity 162 and the third cavity 186 generally do not communicate with each other through outer peripheries of the liner member 178. However, the liner member 178 has a plurality of passages 274 and both of the fluid cavities 162, 164 are connected with each other through the passages 274. In other words, the upper side (facing the first cavity 162) and lower side (facing the third cavity 186) of the tilt cylinder 150 are divided by the liner member 178 and only the passages 274 connect both of the sides. Although the liner member 178 can include any number of the passages 274, there are eight passages 274 in the illustrated embodiment.

The aforenoted second shock absorber valving mechanisms are placed in the respective passages 274 and indicated with the reference numeral 276. Each of the second shock absorber valve 276 includes a ball 280 which is seated at the valve seat 282, a retainer 284 which retains the ball 280, a spring 286 which disposed between the retainer 284 and the retainer plate 260 and urges the ball 280 via the retainer 284 to close the passage 274. The spring force of this spring 286 is selected to be greater than the spring force of the spring 218 in the tilt piston 166 so that the ball 280 will move away from the closing position of the passage 274 only when a tremendous pressure is produced in the first cavity 162.

The upper ends of the passages 274 are covered with a filter element 290 that is disposed in a circular recess 292 formed at the upper most portion of the liner member 178. A cover plate 294 is inserted between the flange 264 and the liner member 178 to restrict the filter element 290 from detaching. In the illustrated embodiment, the cover plate 294 has eight slits 296 and the filter element 290 is exposed to the first cavity 162 through these slits 296. Although not shown, each of the shock absorber valves 276 is disposed under each slit 296. Because of this filter element 290, foreign particles are filtered before reaching the shock absorber valves 276. Thus, the shock absorber valves 276 will not be significantly affected by such foreign particles even if they exist in the first fluid cavity 162 and the hydraulic device 66 can hold the drive unit 81 at an adjusted trim position. The more the shock absorber valves 276 are provided, the larger the effect of the filter element 290 will be, because chances of the foreign particles' invasion increase. It should be noted that this kind of filter element can of course also be provided at the shock absorber valve 210 in the tilt piston 166 if space is available. Although desired, the present cylinder assembly need not include the filter at either of the locations.

Returning back to the shock absorber valves 276 per se, when an underwater obstacle is struck, primarily the shock absorber valve 210 in the tilt piston 166 permits flow of the fluid from the first cavity 162 to the second cavity 164 so that the drive unit 81 can clear the underwater obstacle. However, if a very massive obstacle is struck, all of the second shock absorber valves 276 simultaneously open to permit flow of the fluid in the first cavity 162 to the third cavity 186. The aforenoted tremendous pressure produced in the first cavity 162 is effectively released and the tilt piston 166 can rapidly move upwardly. Thus, the drive unit 81 can smoothly clear the massive obstacle. After clearing the obstacle, the operator pushes the switch button of the powering assembly 86 to turn it on. Upon this action, the fluid in the third cavity 186 returns to the first cavity through the internal passage and the drive unit 81 will be lowered down. If, however, at least one of the passages 274 is formed as a return valving passage like the passage 220 in the tilt piston 166, through which the fluid in the third cavity 186 can return to the first cavity 162, the drive unit 81 can be lowered without the operation of the powering assembly 86.

In this regard, however, since the fluid in the first cavity 162 moves to the third cavity 186 under the floating piston 180, the memory function of the floating piston 180 will no longer be preserved. However, the urgent avoidance of the possible damage onto the drive unit 81 is more important. Because of this reason, the function of the second shock absorber mechanism 276 seems to be appreciated.

It should be noted that the end cap 156 is dispensable if focusing only to the purpose of the shock-absorbing function. That is, the first fluid cavity 162 and the second fluid cavity 164 can be unified without any partition.

It is advantageous that the second shock absorber valves 276 are placed at outer periphery of the tilt cylinder 150, specifically in the liner member 178, because it would be difficult to find a space for the second shock absorber valves 276 in the tilt piston 166. A number of shock absorber valves 276 are available in this arrangement so that a relatively large amount of fluid in the first cavity 162 can be released quickly.

It is also advantageous to provide the filter element 290 upstream of the second shock absorber valves 276. Because if foreign particles enter the fluid and they adversely affect the operation of at least one of the second shock absorber valves 276, the drive unit of the outboard motor 60 can no longer be kept under the trim adjusted condition, which is one of the most important function of the hydraulic device 66. This risk can be effectively avoided with the filter element 290.

The first shock absorber valve 210 in the tilt piston 166 is dispensable if only the shock absorber function is required. In this arrangement, it is desirable that at least one of the passages 274 is formed as a return valving passage through which the fluid in the third cavity 186 can return to the first cavity 162.

It should be noted, however, that the features of this invention are applicable other than the telescopic type hydraulic device unless any limitation to the telescopic type is recited in the following claims. Also, a filter element is practicable with the shock absorber valve in the tilt piston.

It should be also noted that the marine outboard drive can include a stern drive of an inboard engine/outboard drive system as well as an outboard motor. Of course, the foregoing description is that of preferred embodiments of the invention, and various changes and modifications may be made without departing from the spirit and scope of the invention, as defined by the appended claims.

What is claimed is:

1. A tilt and trim cylinder arrangement for an outboard drive and watercraft comprising an outer cylinder adapted to be affixed to one of the outboard drive and the watercraft and defining a first internal cavity, a tilt cylinder received and slidably supported within the first internal cavity and defining a second internal cavity, a tilt piston received and slidably supported within the second internal cavity, a piston rod affixed to the tilt piston and extending beyond the internal cavities for attachment to the other of the outboard drive and the watercraft, a first valving mechanism disposed in the tilt piston for causing a first shock-absorbing flow of fluid across the sides of the tilt piston for permitting the piston rod to move out from the first and second internal cavities when an underwater obstacle is struck with sufficient force that is greater than a first preset force, and a second valving mechanism configured to permit a second shock-absorbing flow of the fluid across the sides of the tilt cylinder for permitting the tilt cylinder to slide within the first internal cavity.

2. A tilt and trim cylinder arrangement as set forth in claim 1, wherein the first valving mechanism operates when one of the sides of the tilt piston from which the piston rod extends is pressurized with pressure larger than a predetermined pressure, the second valving mechanism operates when one of the sides of the tilt cylinder from which the piston rod extends is pressurized with pressure larger than a predetermined pressure, and the predetermined pressure by which the second valving mechanism operates is larger than the predetermined pressure by which the first valving mechanism operates.

3. A tilt and trim cylinder arrangement as set forth in claim 1, wherein the second valving mechanism is provided at an outer periphery of the tilt cylinder.

4. A tilt and trim arrangement as set forth in claim 3, wherein the second valving mechanism is provided at generally the end of the tilt cylinder.

5. A tilt and trim cylinder arrangement as set forth in claim 1, wherein the second valving mechanism includes a passage through which the fluid flows, a closure assembly for closing the passage unless the underwater obstacle is struck.

6. A tilt and trim cylinder arrangement as set forth in claim 5, wherein the second valving mechanism further includes a filter disposed upstream of the flow of the fluid.

7. A tilt and trim cylinder arrangement as set forth in claim 1 additionally comprising a plurality of the second valving mechanisms.

8. A tilt and trim cylinder arrangement as set forth in claim 1 further comprising a floating piston at the opposite side of the piston rod in the second internal cavity.

9. A tilt and trim cylinder arrangement as set forth in claim 1 additionally comprising means for selectively pressurizing the first cavity to cause reciprocal movement of the tilt cylinder and effect both trim adjustment of the outboard drive and tilt up movement of the outboard drive.

10. A tilt and trim cylinder arrangement as set forth in claim 1, wherein the tilt cylinder includes a portion dividing the first internal cavity into two chambers together with the outer cylinder so that each side of the portion faces each one of the chambers, the second valving mechanism is disposed at the portion of the tilt cylinder, and the shock-absorbing flow of the fluid is caused across the sides of the portion toward one of the chambers from the other chamber.

11. A tilt and trim cylinder arrangement as set forth in claim 1, wherein the second valving mechanism permits the piston rod to move out further from the first and second internal cavities when the underwater obstacle struck with the force that is greater than a second preset force, and the second preset force is greater than the first preset force.

12. A tilt and trim cylinder arrangement as set forth in claim 1, wherein the second valving mechanism includes a passage through which the fluid flows, a closure member arranged to close the passage so as to prevent the fluid from flowing unless the underwater obstacle is struck with the force greater than a second preset force, and a filter disposed upstream of the closure member.

13. A tilt and trim cylinder arrangement for an outboard drive and watercraft comprising an outer cylinder adapted to be affixed to one of the outboard drive in the watercraft and defining a first internal cavity, a tilt cylinder received and slidably supported within the first internal cavity and defining a second internal cavity, a tilt piston received and slidably supported within the second internal cavity, a piston rod affixed to the tilt piston and extending beyond the internal cavities for attachment to the other of the outboard drive and the watercraft, a first valving mechanism configured for causing a first shock-absorbing flow of fluid across the sides of the tilt piston for permitting the piston rod to move out from the first and second internal cavities when an underwater obstacle is struck with sufficient force that is greater than a first preset force, and a second valving mechanism configured to permit a second shock-absorbing flow of the fluid across the sides of the tilt cylinder for permitting the tilt cylinder to slide within the first internal cavity, wherein the second valving mechanism is incorporated in a liner member fitted around an outer periphery of the tilt cylinder.

14. A tilt and trim cylinder arrangement as set forth in claim 13, wherein the liner member is bound to the tilt cylinder so as to move dependently with the tilt cylinder.

15. A tilt and trim cylinder arrangement as set forth in claim 14, wherein a seal member is provided between the tilt cylinder and the liner member.

16. A tilt and trim cylinder arrangement as set forth in claim 15, wherein another seal member is provided between the outer cylinder and the liner member.

17. A tilt and trim cylinder arrangement for an outboard drive and watercraft comprising an outer cylinder adapted to be affixed to one of the outboard drive and the watercraft and defining a first internal cavity, a tilt cylinder received and slidably supported within the first internal cavity and defining a second internal cavity, a tilt piston received and slidably supported within the second internal cavity, a piston rod affixed to the tilt piston and extending beyond the internal cavities for attachment to the other of the outboard drive and the watercraft, and a valving mechanism in the tilt cylinder for causing shock-absorbing flow of fluid across the sides of the tilt cylinder for allowing the tilt cylinder to slide relative to the first internal cavity and permitting popping up of the outboard drive when an underwater obstacle is struck with sufficient force.

18. A tilt and trim cylinder arrangement as set forth in claim 17, wherein the valving mechanism is provided at an outer periphery of the tilt cylinder.

19. A tilt and trim cylinder arrangement as set forth in claim 17, wherein the valving mechanism includes a passage through which the fluid flows, a closure assembly for closing the passage unless the underwater obstacle is struck.

20. A tilt and trim cylinder arrangement as set forth in claim 19, wherein the valving mechanism further includes a filter disposed upstream of the flow of the fluid.

21. A tilt and trim cylinder arrangement as set forth in claim 17 additionally comprising a plurality of the valving mechanisms.

22. A tilt and trim cylinder arrangement as set forth in claim 17 additionally comprising means for selectively pressurizing the first cavity for causing reciprocal movement of the tilt cylinder and the tilt piston to effect both trim adjustment and tilt up movement of the outboard drive.

23. A tilt and trim cylinder arrangement for an outboard drive and watercraft comprising an outer cylinder adapted to be affixed to one of the outboard drive end of the watercraft and defining a first internal cavity, a tilt cylinder received and slidably supported within the first internal cavity and defining a second internal cavity, a tilt piston received and slidably supported within the second internal cavity, a piston rod affixed to the tilt piston and extending beyond the internal cavities for attachment to the other of the outboard drive and the watercraft, and a valving mechanism for causing shock absorbing flow of fluid across the sides of the tilt cylinder for permitting popping up of the outboard drive when an underwater obstacle is struck with sufficient force, wherein the valving mechanism is incorporated in a liner member fitted around an outer periphery of the tilt cylinder.

24. A hydraulic cylinder arrangement for an outboard drive and watercraft comprising an outer cylinder adapted to be affixed to one of the outboard drive and the watercraft and defining a first internal cavity, a tilt cylinder received and slidably supported within the first internal cavity and defining a second internal cavity, the tilt cylinder including a portion dividing the first internal cavity into two chambers, a tilt piston received and slidably supported within the second internal cavity, a piston rod affixed to the tilt piston and extending beyond the internal cavities for attachment to the other end of the outboard drive and the watercraft, means for permitting a first shock-absorbing flow of fluid across the piston for permitting the outboard drive to pop up when an underwater obstacle is struck with sufficient force while remembering a trim position that the outboard drive was in before the underwater obstacle was struck, and means for permitting a second shock-absorbing flow of the fluid between the two chambers of the first cavity, but without remembering the trim position of the outboard drive.

25. A hydraulic cylinder arrangement for an outboard drive and watercraft comprising an outer cylinder adapted to be affixed to one of the outboard drive and the watercraft and defining a first internal cavity, a tilt cylinder received and slidably supported within the first internal cavity and defining a second internal cavity, a tilt piston received and slidably supported within the second internal cavity, a piston rod affixed to the tilt piston and extending beyond the internal cavities for attachment to the other of the outboard drive and the watercraft, and a liner member affixed to the tilt cylinder at an outer periphery thereof and dividing the first internal cavity into two chambers together with the outer cylinder, the liner member including a fluid passage and a closure member arranged to close the passage, the closure member permitting the fluid to flow through the passage when an underwater obstacle is struck with force that is greater than preset force so that the piston rod moves out from the first and second internal cavities.

* * * * *

UNITED STATES PATENT AND TRADEMARK OFFICE
CERTIFICATE OF CORRECTION

PATENT NO. : 6,309,264 B1
DATED : October 30, 2001
INVENTOR(S) : Saito

It is certified that error appears in the above-identified patent and that said Letters Patent is hereby corrected as shown below:

<u>Title page,</u>
Item [73], please add Assignment data:
-- [73] Assignees: Soqi Kabushiki Kaisha, Kakegawa, Shizuoka, Japan --

Signed and Sealed this

Fifteenth Day of October, 2002

*Attest:*

*Attesting Officer*

JAMES E. ROGAN
*Director of the United States Patent and Trademark Office*